United States Patent
Ohtsuji

(10) Patent No.: US 10,824,599 B2
(45) Date of Patent: Nov. 3, 2020

(54) INFORMATION PROCESSING APPARATUS, INFORMATION PROCESSING METHOD, AND RECORDING MEDIUM

(71) Applicant: FUJITSU LIMITED, Kawasaki (JP)

(72) Inventor: Hiroki Ohtsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 16/046,242

(22) Filed: Jul. 26, 2018

(65) Prior Publication Data

US 2019/0065519 A1 Feb. 28, 2019

(30) Foreign Application Priority Data

Aug. 31, 2017 (JP) ................................ 2017-166651

(51) Int. Cl.
*G06F 16/00* (2019.01)
*G06F 16/174* (2019.01)

(52) U.S. Cl.
CPC ...... *G06F 16/1744* (2019.01); *G06F 16/1748* (2019.01)

(58) Field of Classification Search
CPC .......................... G06F 16/1744; G06F 16/1748
USPC ........................................................ 707/693
See application file for complete search history.

(56) References Cited

U.S. PATENT DOCUMENTS

| | | | | |
|---|---|---|---|---|
| 7,424,482 B2* | 9/2008 | Kedem | ................ | G06F 3/0671 |
| 7,898,442 B1* | 3/2011 | Sovik | ................ | H03M 7/3088 |
| | | | | 341/51 |
| 7,979,403 B2* | 7/2011 | Kedem | ................ | G06F 3/0608 |
| | | | | 707/693 |
| 8,285,898 B2* | 10/2012 | Amit | ................ | G06F 16/00 |
| | | | | 710/68 |
| 8,745,338 B1* | 6/2014 | Yadav | ................ | G06F 3/061 |
| | | | | 711/154 |
| 9,367,557 B1* | 6/2016 | Lin | ................ | G06F 16/1744 |
| 9,646,043 B1* | 5/2017 | Aronovich | ................ | G06F 16/1748 |
| 9,965,394 B2* | 5/2018 | Romanovskiy | ................ | G06F 3/0644 |
| 10,019,457 B1* | 7/2018 | Stefani | ................ | H03M 7/6076 |
| 10,216,754 B1* | 2/2019 | Douglis | ................ | G06F 16/1744 |
| 2006/0184505 A1* | 8/2006 | Kedem | ................ | G06F 3/0608 |
| 2007/0172134 A1* | 7/2007 | Namera | ................ | H04N 19/184 |
| | | | | 382/232 |
| 2009/0097745 A1* | 4/2009 | Kim | ................ | H04N 9/73 |
| | | | | 382/167 |
| 2009/0271420 A1* | 10/2009 | Kusui | ................ | G06F 16/285 |

(Continued)

FOREIGN PATENT DOCUMENTS

| | | |
|---|---|---|
| JP | 2011-227758 | 11/2011 |
| JP | 2012-113657 | 6/2012 |
| JP | 2013-037519 | 2/2013 |

*Primary Examiner* — Thanh-Ha Dang
(74) *Attorney, Agent, or Firm* — Xsensus LLP

(57) ABSTRACT

An information processing apparatus includes a data storage, and a processor coupled to the data storage and that executes a process including dividing data including a plurality of blocks, performing, for each portion generated by dividing the data, first clustering of blocks included in each of the portions based on similarities between the blocks included in each of the portions, determining, among the plurality of blocks, blocks to be collectively compressed based on results of the first clustering performed for each of the portions, and collectively compressing data of the determined blocks before storing the data into the data storage.

12 Claims, 18 Drawing Sheets

(56) References Cited

U.S. PATENT DOCUMENTS

| | | |
|---|---|---|
| 2011/0264443 A1 | 10/2011 | Takamatsu |
| 2012/0158709 A1* | 6/2012 | Gaonkar ............... G06F 16/214 |
| | | 707/723 |
| 2016/0165012 A1* | 6/2016 | Li ..................... H04N 1/32277 |
| | | 709/247 |
| 2016/0378844 A1* | 12/2016 | Karve ................ G06F 16/2365 |
| | | 707/620 |
| 2019/0073528 A1* | 3/2019 | Agarwalla ........... G06K 9/6256 |

\* cited by examiner

INFORMATION PROCESSING APPARATUS, INFORMATION PROCESSING METHOD, AND RECORDING MEDIUM

CROSS-REFERENCE TO RELATED APPLICATIONS

This application is based upon and claims the benefit of priority of the prior Japanese Patent Application No. 2017-166651, filed on Aug. 31, 2017, the entire contents of which are incorporated herein by reference.

FIELD

The disclosures herein relate to a data compression technique.

BACKGROUND

Block storage is storage in which data is accessed in units called blocks. Data written to such block storage may be compressed in order to conserve block storage space.

FIG. 1 is a diagram illustrating block compression. In FIG. 1, four blocks are individually compressed. Typically, a dictionary-based compression algorithm is based on the assumption that the same data column appears more than once. Therefore, instead of compressing the four blocks individually as illustrated in FIG. 1, a compression ratio improves by compressing the four blocks collectively. In the example of FIG. 1, even if the same data column is included in block 1 and block 2, the block 1 and the block 2 including the same data column are not collectively compressed.

In order to find blocks that can be collectively compressed, a process for checking a relationship between the blocks is performed. However, there is a problem in that, depending on the data size, this process takes a long time. Conventional techniques disclosed in Patent Documents are not suitable for solving this problem.

RELATED-ART DOCUMENTS

[Patent Document]

[Patent Document 1] Japanese Laid-open Patent Publication No. 2013-37519

[Patent Document 2] Japanese Laid-open Patent Publication No. 2012-113657

[Patent Document 3] Japanese Laid-open Patent Publication No. 2011-227758

SUMMARY

According to at least one embodiment, an information processing apparatus includes a data storage, and a processor coupled to the data storage and that executes a process including dividing data including a plurality of blocks, performing, for each portion generated by dividing the data, first clustering of blocks included in each of the portions based on similarities between the blocks included in each of the portions, determining, among the plurality of blocks, blocks to be collectively compressed based on results of the first clustering performed for each of the portions, and collectively compressing data of the determined blocks before storing the data into the data storage.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the present invention will be described with reference to the accompanying drawings.

Figure 1:
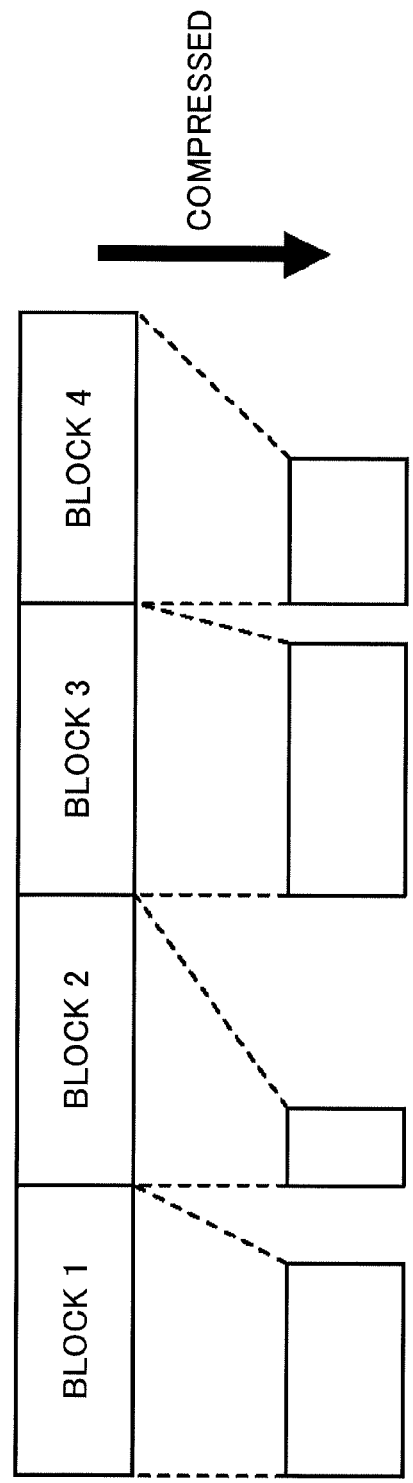
FIG. 1 is a diagram illustrating block compression.
Figure 2:
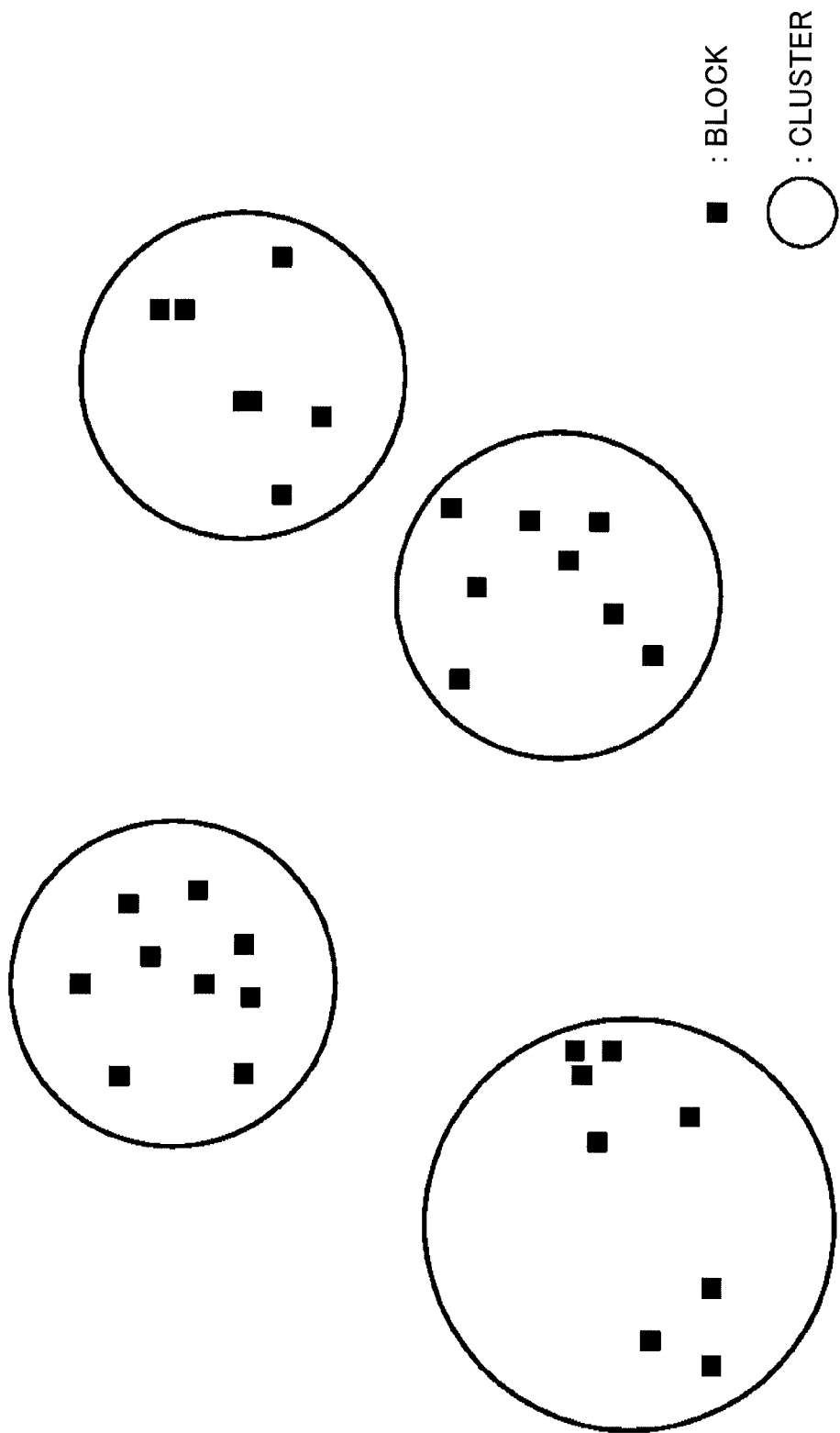
FIG. 2 is a diagram illustrating clustering based on similarities.

In the following embodiments, batch compression of similar blocks allows a compression ratio to improve. FIG. 2 is a diagram illustrating clustering based on similarities. In FIG. 2, four clusters are generated in a space where blocks are placed in such a manner that a distance between similar blocks becomes shorter. As blocks included in the same cluster are expected to include a number of the same data columns, by collectively compressing the blocks included in the same cluster instead of compressing the blocks individually, a compression ratio is considered to be improved. However, as described above, it may take a long time to simply calculate similarities between blocks included in the same data.

For example, when 1 gigabyte (GB) data having a block size of 8 kilobytes (KB) is assumed to be compressed, the data includes 1024×1024/8=131072 blocks. In order to calculate similarities between pairs (pairings) of the blocks, $31072^2/2 \approx 0.85 \times 1010$ times of computation is required. When it is assumed that it takes $0.1\mu$ seconds to complete each computation, it takes 850 seconds to complete 1010 times of computation. In reality, taking this amount of time only to calculate similarities when compressing the 1 GB data is not acceptable.

Figure 3:
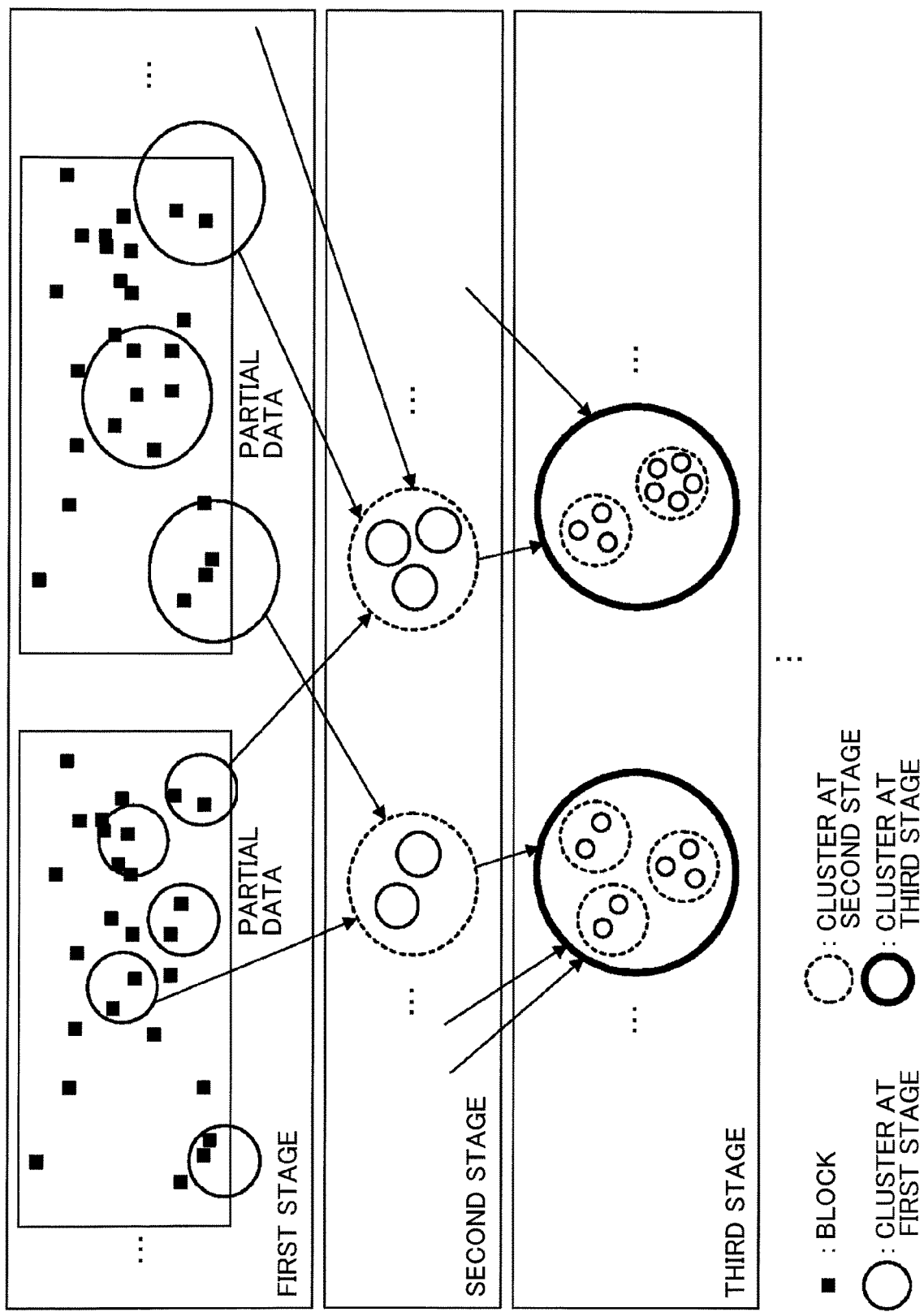
FIG. 3 is a diagram illustrating multistage clustering.

Accordingly, in the following embodiments, by performing multistage clustering based on similarities, the amount of computation can be reduced. FIG. 3 is a diagram illustrating multistage clustering. Data to be written is divided into partial data, similarities are calculated for each of the partial data, and a first-stage clustering is performed based on the calculated similarities. Such clustering allows the amount of computation to be reduced, compared to when similarities are calculated in the entire data and clustering is performed.

Further, a second-stage clustering is performed based on similarities for clusters generated by the first-stage clustering. Similarly, a third-stage clustering is performed based on similarities for clusters generated by the second-stage clustering. In this way, clustering is repeated until predetermined stages of clustering are performed or until clustering can no longer be performed.

In such a method, similarities between blocks included in different partial data are calculated, allowing the amount of computation to be reduced while preventing a compression ratio from decreasing.

First Embodiment

Figure 4:
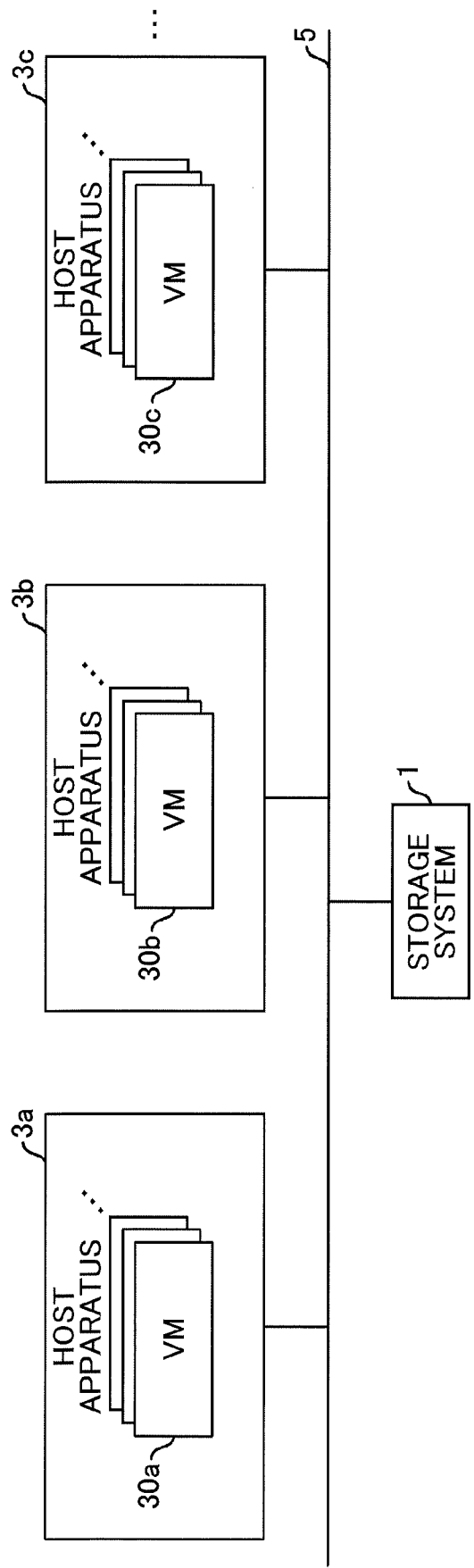
FIG. 4 is a diagram illustrating a system overview according to a first embodiment.

FIG. 4 is a diagram illustrating a system overview according to a first embodiment. A storage system 1 is block storage utilized via a network 5 such as a storage area network (SAN). Host apparatuses 3a through 3c are, for example, server apparatuses. One or more virtual machines (VMs) 30a run on the host apparatus 3a, one or more VMs 30b run on the host apparatus 3b, and one or more VMs 30c run on the host apparatus 3c. The VMs 30a through VMs 30c access data stored in the storage system 1 based on the iSCSI (Internet Small Computer System Interface) protocol, the Fibre Channel (FC) protocol, or the like. In FIG. 4, the number of host apparatuses is 3, but there is no limitation in the number.

Figure 5:
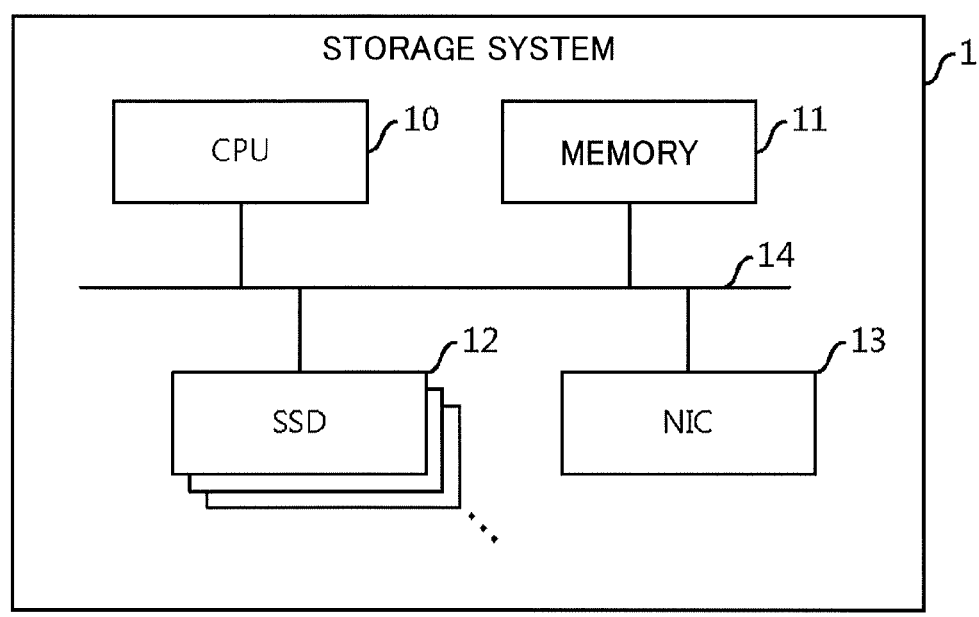
FIG. 5 is a diagram illustrating a hardware configuration of a storage system.

FIG. 5 is a diagram illustrating a hardware configuration of the storage system 1. The storage system 1 includes a central processing unit (CPU) 10, a memory 11 such as a dynamic random access memory (DRAM), at least one solid-state drive (SSD) 12 including a non-volatile storage medium such as flash memory, and a network interface card (NIC) 13 such as a FC card. The CPU 10, the memory 11, the at least one SSD 12, and the NIC 13 are connected via a bus 14. The at least one SSD 12 stores compressed data accessed by the VMs 30a through VMs 30c. The memory 11 includes a region that stores a program executed by the CPU 10 and data used to execute the program, and includes a cache region 102 that temporarily stores data to be written to the at least one SSD 12. A dedicated cache memory for the cache region 102 may be provided. Also, the storage system 1 may include other hardware.

Figure 6:
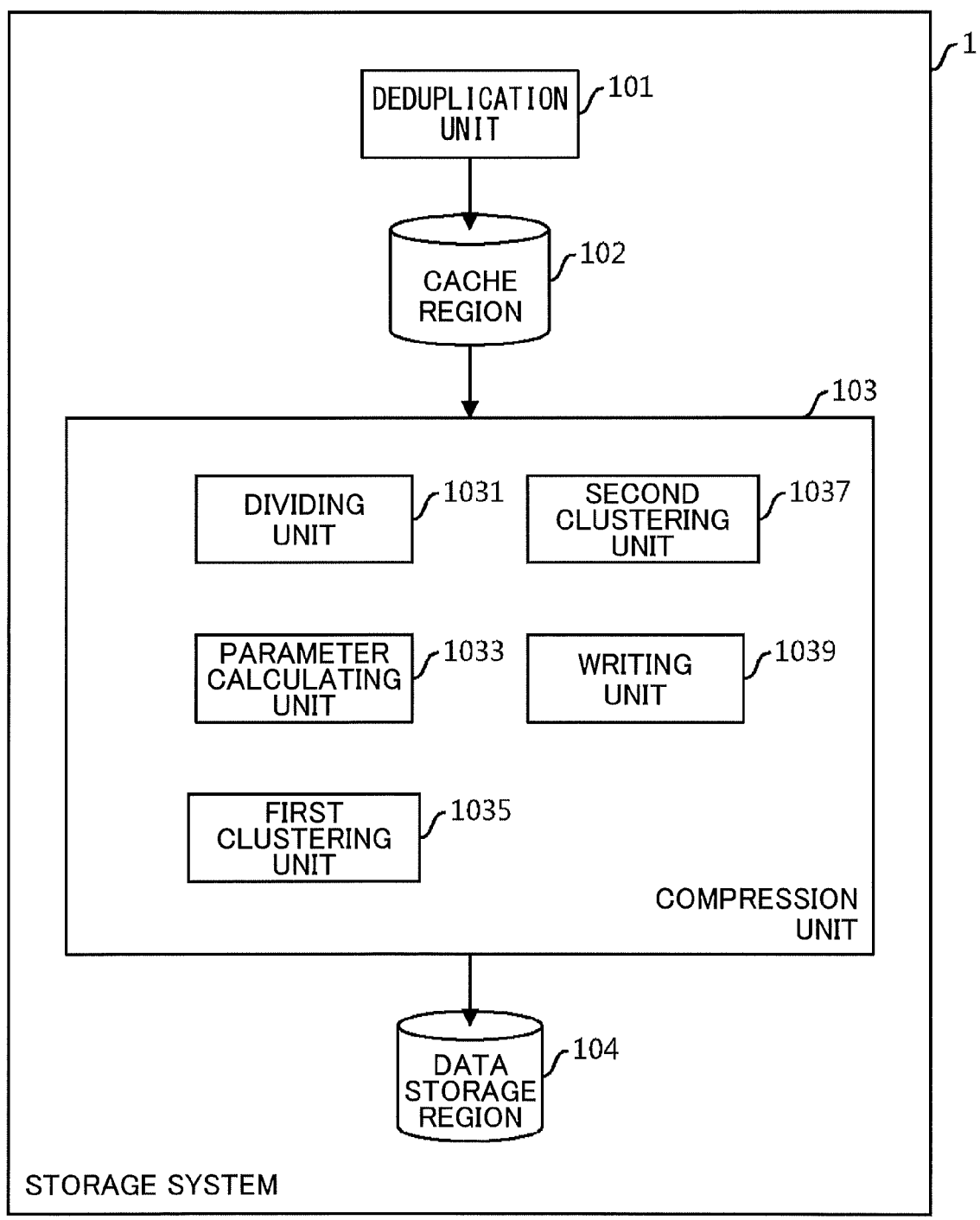
FIG. 6 is a functional block diagram of a storage system.

FIG. 6 is a functional block diagram of the storage system 1. The storage system 1 includes a deduplication unit 101, the cache region 102, a compression unit 103, and a data storage region 104. The compression unit 103 includes a dividing unit 1031, a parameter calculating unit 1033, a first clustering unit 1035, a second clustering unit 1037, and a writing unit 1039.

The deduplication unit 101 and the compression unit 103 are implemented by, for example, causing the CPU 10 to execute a program loaded in the memory 11 illustrated in FIG. 5. The cache region 102 is implemented by using the memory 11. The data storage region 104 is implemented by using the at least one SSD 12.

The deduplication unit 101 performs processing for eliminating duplicates from data written by the VMs 30a through VMs 30c, and stores deduplicated data in the cache region 102. The dividing unit 1031 performs processing for dividing data stored in the cache region 102. The parameter calculating unit 1033 performs processing for calculating a parameter used in processing performed by the first clustering unit 1035. The first clustering unit 1035 performs the processing by using partial data generated by the dividing unit 1031 and the parameter calculated by the parameter calculating unit 1033, and outputs processing results to the second clustering unit 1037. The second clustering unit 1037 performs processing based on the processing results received from the first clustering unit 1035, and outputs processing results to the writing unit 1039. The writing unit 1039 compresses data based on the processing results received from the second clustering unit 1037, and stores the compressed data in the data storage region 104.

Further, access requests from the VMs 30a through VMs 30c include logical addresses (logical block addresses: LBAs). Logical volumes are created on the SSD 12. The logical volumes each have an independent logical address space. As the SSD 12 has physical addresses, the storage system 1 includes a conversion table indicating correspondence relations between logical addresses and physical addresses, and the conversion table coverts the logical addresses into the physical addresses.

Figure 7:
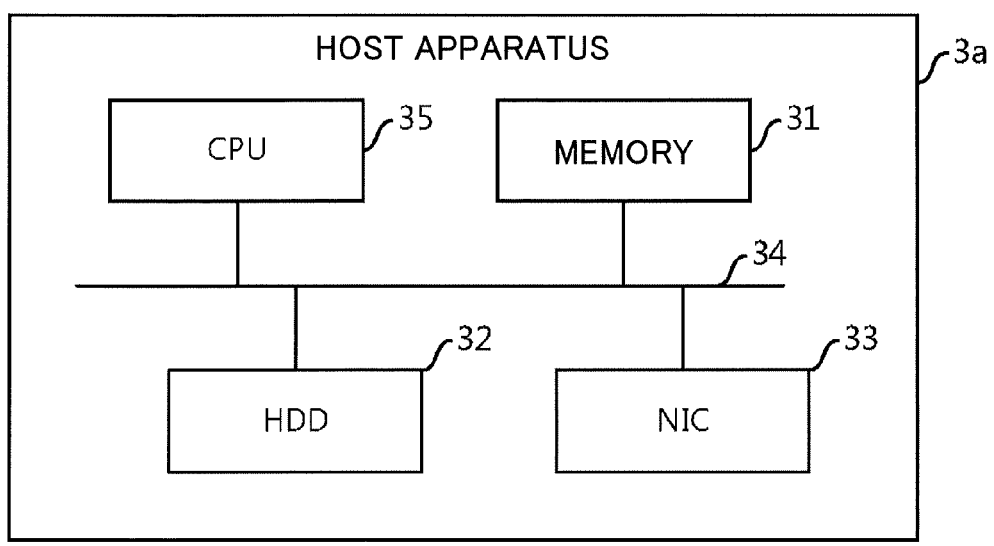
FIG. 7 is a hardware configuration diagram of a host apparatus.

FIG. 7 is a diagram illustrating a hardware configuration of the host apparatus 3a. The host apparatus 3a includes a CPU 35, a memory 31 such as a DRAM, a hard disk drive (HDD) 32, and a NIC 33 such as a FC card. The CPU 35, the memory 31, the HDD 32, and the NIC 33 are connected via a bus 34. The HDD 32 stores a hypervisor program. The hypervisor is implemented by causing the CPU 35 to execute the program loaded in the memory 31. The VMs 30a run on the hypervisor. Hardware configuration diagrams of the host apparatuses 3b and 3c are the same as the hardware configuration diagram of the host apparatus 3a.

Next, a process performed by the storage system 1 will be described in more detail.

Figure 8:
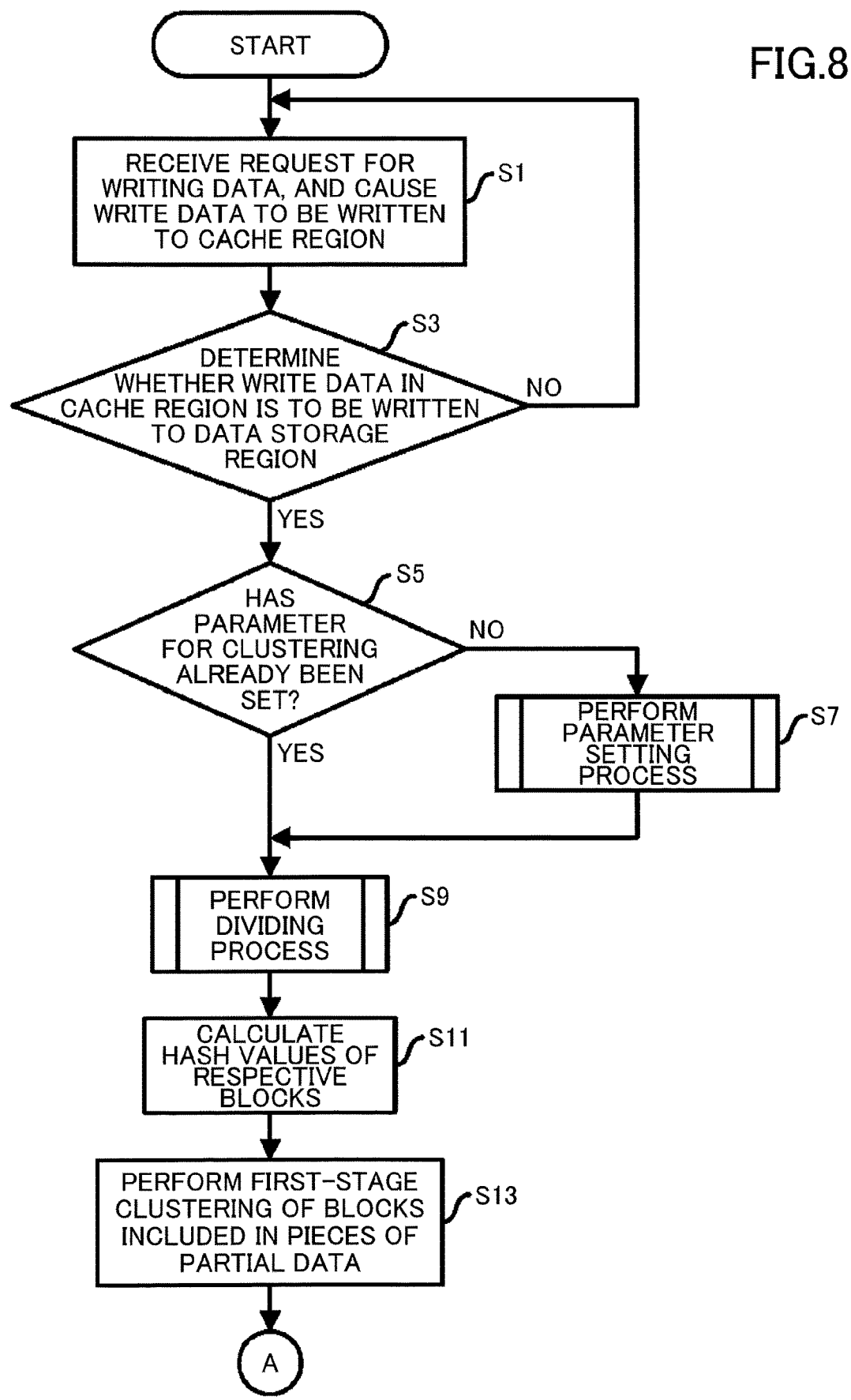
FIG. 8 is a flowchart illustrating a flow of a process performed by the storage system.

FIG. 8 is a flowchart illustrating a flow of a process performed by the storage system 1.

First, the deduplication unit 101 receives a request for writing data. The deduplication unit 101 performs the processing for eliminating duplicates from data that is to be written to the SSD 12 (hereinafter referred to as "write data"), and writes the deduplicated write data to the cache region 102 (step S1 in FIG. 8).

The dividing unit 1031 determines whether the write data in the cache region 102 is written to the data storage region 104 (step S3). In step S3, for example, the determination is made based on whether the size of the write data in the cache region 102 is greater than or equal to a predetermined size.

When it is determined that the write data in the cache region 102 is not written to the data storage region 104 (no in step S3), the process returns to step S1. When it is determined that the write data in the cache region 102 is written to the data storage region 104 (yes in step S3), the dividing unit 1031 determines whether a parameter for clustering has already been set (step S5). The parameter refers to a parameter used in a first-stage clustering. This parameter is hereinafter referred to as a parameter S.

When the clustering parameter has already been set (yes in step S5), the process proceeds to step S9. When the clustering parameter has not been set (no in step S5), the dividing unit 1031 calls the parameter calculating unit 1033. The parameter calculating unit 1033 performs a parameter setting process (step S7).

Figure 9:
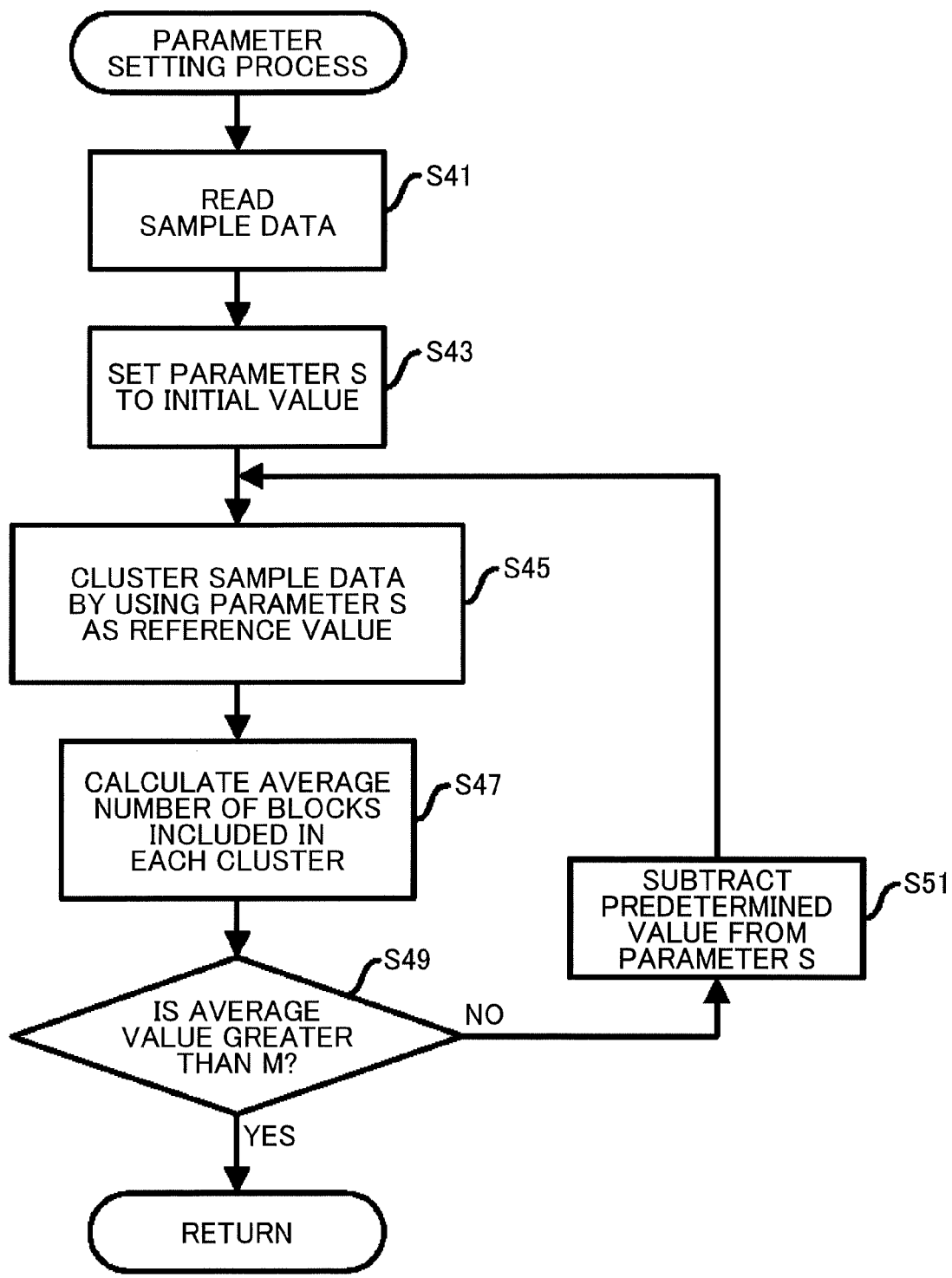
FIG. 9 is a flowchart illustrating a flow of a parameter setting process.

FIG. 9 is a flowchart illustrating a flow of the parameter setting process.

The parameter calculating unit 1033 reads sample data (step S41 in FIG. 9). The sample data may be data stored in the SSD 12 or may be data preliminarily prepared as sample data and stored in another storage device. For example, no sample data may exist when the parameter setting process is performed at a time of set-up. In such a case, the parameter S may be set to an initial value in step S43, and the parameter setting process may be finished. Further, the size of the sample data is preferably approximately the same as the size of partial data.

The parameter calculating unit 1033 sets the parameter S to the initial value (step S43).

The parameter calculating unit 1033 clusters the sample data read in step S41 by using the parameter S as a reference value (step S45). In step S45, clustering similar to the first-stage clustering, which will be described later, is performed.

To be more specific, hash values of blocks included in the sample data are calculated by locality-sensitive hashing, first. The reason why locality-sensitive hashing is used is because, unlike hash algorithms such as Secure Hash Algorithm 1 (SHA-1), similar blocks have similar hash values in locality-sensitive hashing. Subsequently, a similarity between each pair of the hash values is calculated. For example, a similarity between hash values is calculated as a reciprocal of a distance between the hash values. However, such a distance may be used as a dissimilarity. The parameter calculating unit 1033 clusters pairs whose similarities are greater than the parameter S.

Figure 10:
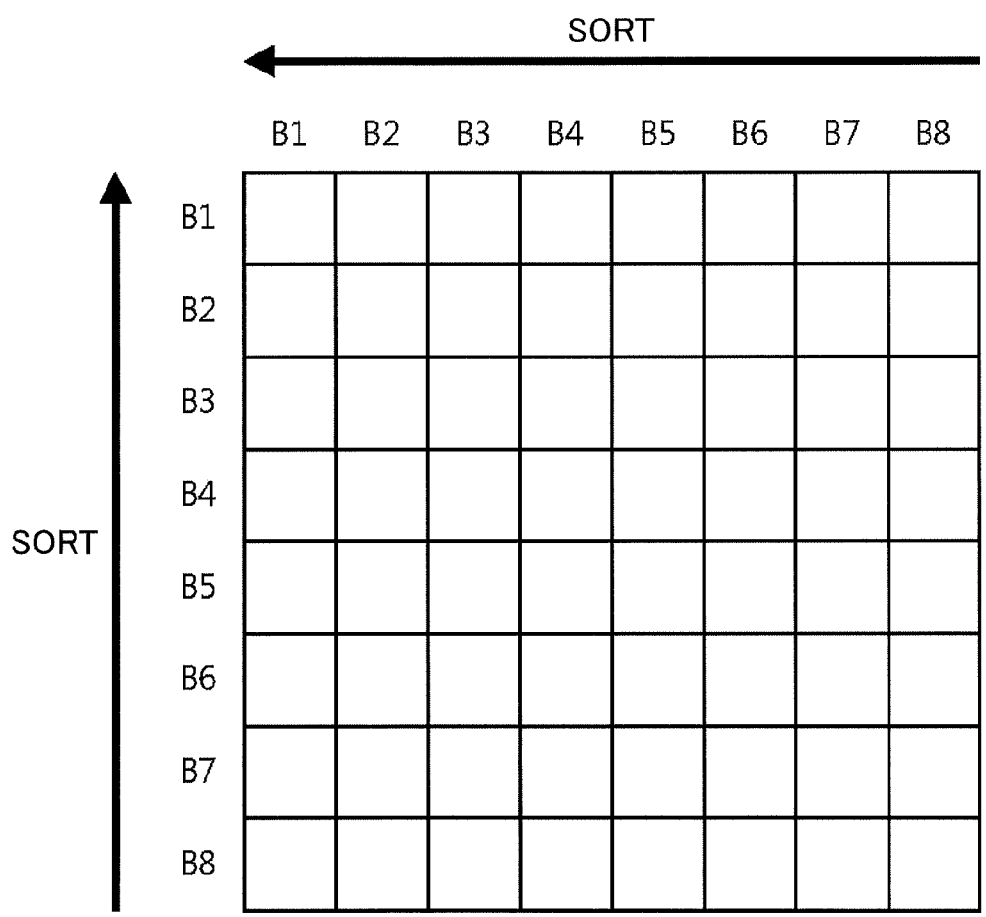
FIG. 10 is a diagram for explaining a clustering method.

FIG. 10 is a diagram for explaining a clustering method. FIG. 10 illustrates similarities between all pairs of blocks B1 through B8 and blocks B1 through B8 of a matrix. A single cell represents a single similarity. However, a calculation of a similarity between each pair of the same blocks may be omitted. Further, a similarity between Bm (m is a natural number satisfying $1 \leq m \leq 8$) and Bn (n is a natural number satisfying $1 \leq n \leq 8$, and $n \neq m$) is the same as a similarity between Bn and Bm. Thus, a calculation of one of the two similarities may be omitted. Further, the pairs of blocks are sorted for each row in order of highest similarity from left to right. Next, the pairs of blocks are sorted for each column in order of highest similarity from top to bottom. Accordingly, the higher similarities are, the nearer the pairs are positioned to the top-left corner cell. Therefore, cells are taken from the top left of the matrix, and one or more clusters are generated in such a manner that each pair of blocks whose hash values have a similarity greater than the parameter S belongs to the same cluster. Note that clustering is performed such that a single block does not belong to a plurality of clusters.

The above-described clustering method is merely an example, and other methods may be used. For example, k-means clustering based on similarities may be performed.

Further, the reason why pairs having similarities greater than the parameter S are clustered is because there is a possibility that a compression ratio does not improve even if blocks that are not very similar are correctively compressed.

The parameter calculating unit 1033 calculates the average number of blocks included in each of the one or more clusters generated by the clustering in step S45 (step S47).

The parameter calculating unit 1033 determines whether the calculated average value is greater than a predetermined value M (step S49). The predetermined value M represents the largest number of blocks included in a cluster. For example, the predetermined value M is calculated as a largest value satisfying (a block size)×M≤(performance requirement for reading latency)×(reading speed from the SSD 12). The performance requirement for reading latency refers to maximum reading latency acceptable by a user, and is, for example, 200 milliseconds.

When the average value calculated in step S47 is not greater than the predetermined value M (no in step S49), a predetermined value is subtracted from the parameter S (step S51), and the process returns to step S45. Conversely, when the average value calculated in step S47 is greater than the predetermined value M, the process returns to the caller.

By performing the above-described process, it is possible to prevent a compression ratio from decreasing when collectively compressing a plurality of blocks included in a cluster.

Referring back to FIG. 8, the dividing unit 1031 performs a dividing process (step S9).

Figure 11:
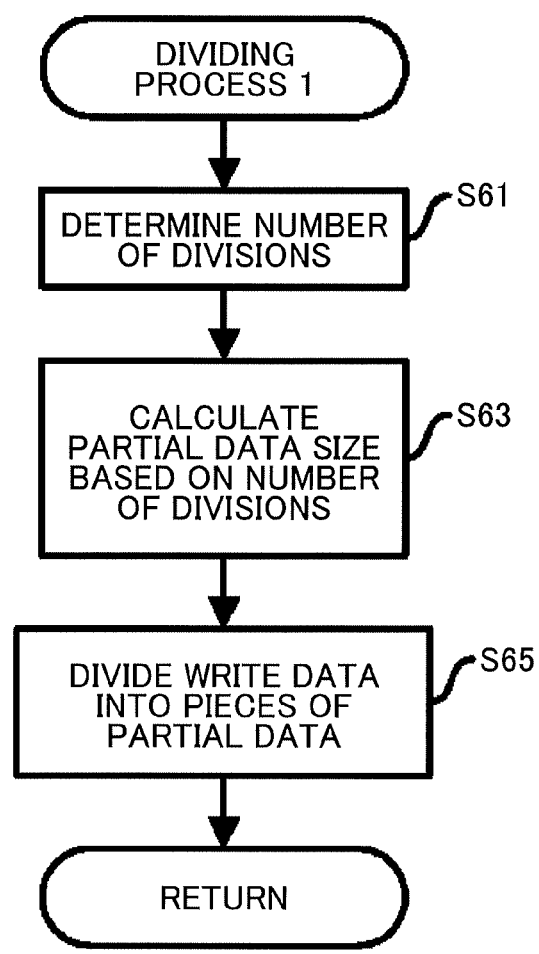
FIG. 11 is a flowchart illustrating a flow of a dividing process according to the first embodiment.

FIG. 11 is a flowchart illustrating a flow of the dividing process according to the first embodiment.

The dividing unit 1031 determines the number of divisions of the write data (step S61 in FIG. 11). The number of divisions refers to the number of portions generated by dividing the write data. In the present embodiment, each portion generated by dividing the write data is referred to as partial data.

For example, in the storage system 1, a target throughput T is assumed to be set. When a period of time required to calculate hash values of blocks is taken as c, a size of write data is taken as D, a block size is taken as B, and the number of divisions is taken as N, a period of time required to calculate similarities in the first-stage clustering is $cD^2/2NB^2$. Therefore, a condition to be satisfied by N is $2NB^2/cD^2 \geq T$. Accordingly, a value satisfying $N \geq cTD^2/2B^2$ may be calculated.

The dividing unit 1031 calculates a partial data size based on the number of divisions (step S63). For example, the partial data size is calculated by dividing the size of the write data by the number of divisions.

The dividing unit 1031 divides the write data into pieces of partial data based on the partial data size calculated in step S63 (step S65). The process returns to the caller.

By performing the above-described process, it is possible to prevent the actual throughput from becoming less than the target throughput T. However, in the above-described process, clustering as of a second-stage clustering is not taken into account. Thus, it is not necessarily assured that the actual throughput is greater than or equal to the target throughput T.

Referring back to FIG. 8, the first clustering unit 1035 calculates hash values of respective blocks included in the write data in the cache region 102 (step S11). In step S9, for example, the hash values are calculated by locality-sensitive hashing.

The first clustering unit 1035 performs the first-stage clustering of blocks included in the pieces of partial data generated in step S65 (step S13). The process proceeds to step S15 in FIG. 12 via a terminal A.

For example, when partial data PD1, partial data PD2, and partial data PD3 are assumed to be generated in step S65, clustering is performed based on similarities between pairs of hash values calculated for blocks included in the partial data PD1, clustering is performed based on similarities between pairs of hash values calculated for blocks included in the partial data PD2, and clustering is performed based on similarities between pairs of hash values calculated for blocks included in the partial data PD3. Accordingly, a plurality of clusters are generated from the entire write data.

Figure 12:
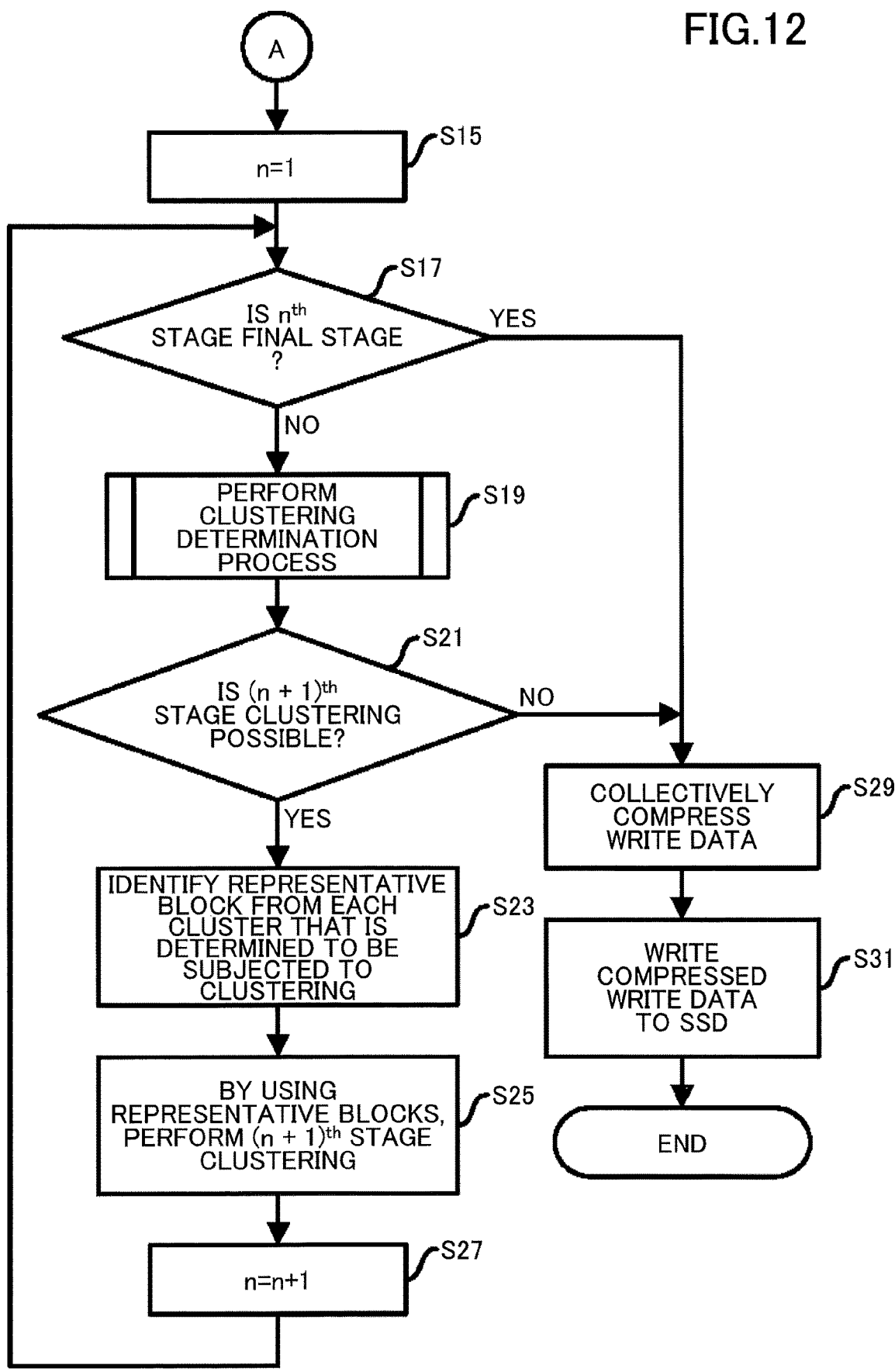
FIG. 12 is a flowchart illustrating a flow of a process performed by the storage system.

Referring now to FIG. 12, the second clustering unit 1037 sets a variable n for identifying a stage to n=1 (step S15 in FIG. 12).

The second clustering unit 1037 determines whether the $n^{th}$ stage is the final stage (step S17).

When the $n^{th}$ stage is the final stage (yes in step S17), the process proceeds to step S29.

When the $n^{th}$ stage is not the final stage (no in step S17), the second clustering unit 1037 performs a clustering determination process (step S19).

Figure 13:
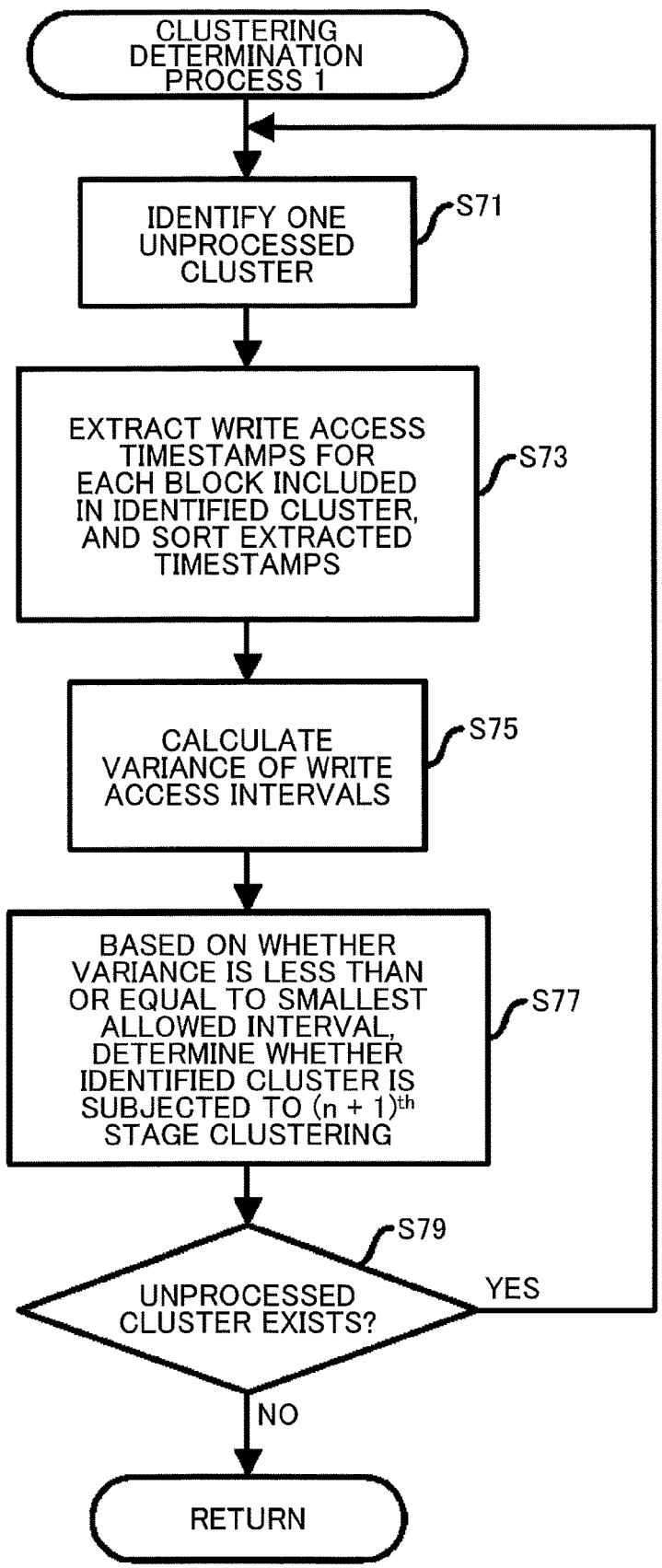
FIG. 13 is a flowchart illustrating a flow of a clustering determination process according to the first embodiment.

FIG. 13 is a flowchart illustrating a flow of the clustering determination process according to the first embodiment.

From the plurality of clusters generated by the previous clustering (namely, the plurality of clusters generated by clustering in step 13 or by clustering in step S25), the second clustering unit 1037 identifies one unprocessed cluster (step S71 in FIG. 13).

The second clustering unit 1037 extracts write access timestamps for each block included in the identified cluster, and sorts the extracted timestamps (step S73).

The second clustering unit 1037 calculates variance of write access intervals (step S75). When the variance for write access intervals is small, this means that temporal locality of access is high.

Based on whether the variance calculated in step S75 is less than or equal to the smallest allowed interval, the second clustering unit 1037 determines whether the cluster identified in step S71 is subjected to the $(n+1)^{th}$ stage clustering (step S77). The smallest allowed interval means a smallest value of an interval at which write access is accepted by the storage system 1.

Figure 14:
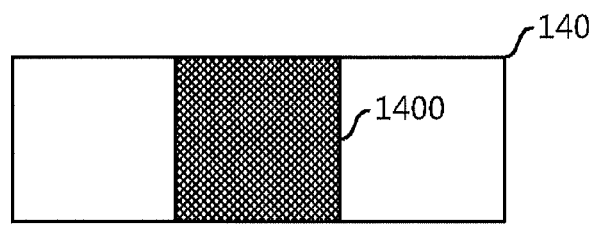
FIG. 14 is a diagram illustrating compressed data.

FIG. 14 is a diagram illustrating compressed data. In FIG. 14, data to be accessed (hereinafter referred to as access data 1400) is included in compressed data 140. In general, even when only a part of data 140 is accessed, the entire compressed data 140 is decompressed. Therefore, when the size of the access data 1400 is small relative to the size of the compressed data 140, unnecessary data reading is required, causing overhead to become large. Therefore, by limiting clusters subjected to the $(n+1)^{th}$ stage clustering in terms of temporal locality, a decrease in data reading performance can be suppressed. Namely, there is an increased possibility that data decompressed and expanded in the cache region 102 is effectively utilized. Further, instead of using variance, other statistics may be used.

The second clustering unit 1037 determines whether an unprocessed cluster exists (step S79). When an unprocessed cluster exists (yes in step S79), the process returns to step S71. When an unprocessed cluster no longer exists (no in step S79), the process returns to the caller.

Referring back to FIG. 12, the second clustering unit 1037 determines whether the $(n+1)^{th}$ stage clustering is possible (step S21). For example, the determination is made based on whether the number of clusters that are determined to be subjected to the $(n+1)^{th}$ stage clustering is two or more.

When the $(n+1)^{th}$ stage clustering is not possible (no in step S21), the process proceeds to step S29.

When the $(n+1)^{th}$ stage clustering is possible (yes in step S21), the second clustering unit 1037 performs the following processing. Specifically, the second clustering unit 1037 identifies a representative block from each cluster that is determined to be subjected to the $(n+1)^{th}$ stage clustering (step S23). The representative block refers to a randomly selected block or a block corresponding to a similarity at the left end of each row in FIG. 10.

By using the representative blocks identified in step S23, the second clustering unit 1037 performs the $(n+1)^{th}$ stage clustering (step S25). For example, when 10 blocks are identified in step S23, hash values of the 10 blocks are calculated, and further, a similarity between each pair of the hash values are calculated. Similarly to step S13, the $(n+1)^{th}$ stage clustering is performed based on the calculated similarities. Accordingly, a plurality of clusters including the $n^{th}$ stage clusters are generated.

The second clustering unit 1037 causes the variable n to be incremented by 1 (step S27). The process returns to step S17.

Conversely, when it is determined that the $n^{th}$ stage is the final stage (yes in step S17) or when it is determined that the $(n+1)^{th}$ stage clustering is not possible (no in step S21), the writing unit 1039 performs the following processing. Specifically, the writing unit 1039 compresses the write data (step S29). In step S29, among the blocks included in the write data, the writing unit 1039 determines blocks to be collectively compressed and collectively compresses the determined blocks, while compressing the other blocks individually.

Figure 15:
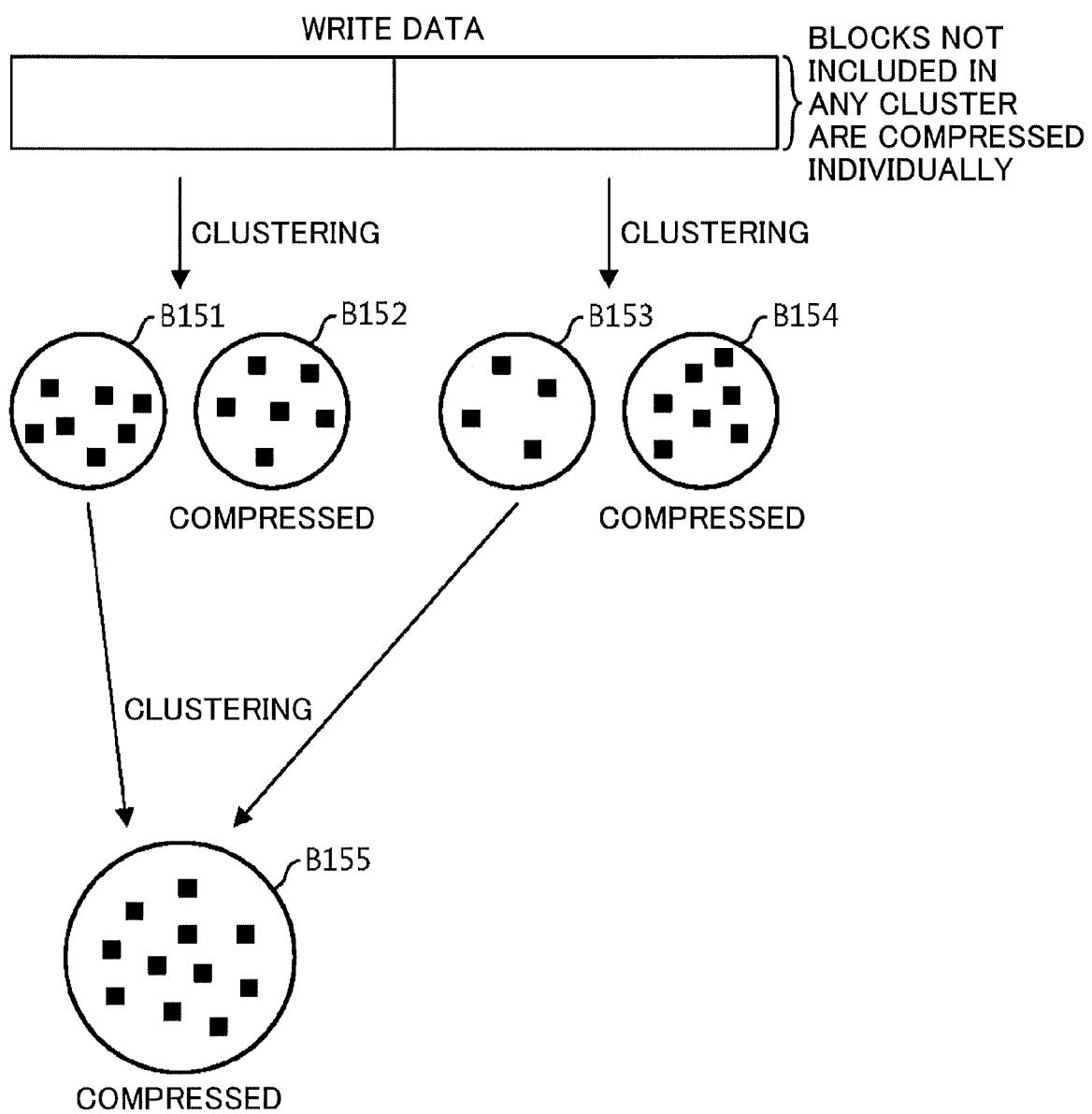
FIG. 15 is a diagram illustrating compression according to the embodiment.

FIG. 15 is a diagram illustrating compression according to the present embodiment. In the example of FIG. 15, the first-stage clustering and the second-stage clustering have been performed. The number of pieces of partial data generated by dividing the write data is two. By the first-stage clustering, clusters B151 and B152 are generated from one partial data, and clusters B153 and B154 are generated from the other partial data. By the second-stage clustering, a cluster B155 is generated from the clusters B151 and B153. In this case, blocks included in the cluster B155 are collectively compressed, blocks included in the cluster B152 are collectively compressed, and blocks included in the cluster B154 are collectively compressed. Blocks not subjected to the first-stage clustering (namely, blocks having similarities less than or equal to the parameter S) are compressed individually.

The writing unit 1039 writes the write data compressed in step S29 to the SSD 12 (step S31). The processing ends.

As described above, it becomes possible to improve a compression ratio by extending a range for finding blocks having the same data column to the entire write data. Further, it has been verified that a compression ratio is improved by 12% by applying the present embodiment to write data in which a plurality of virtual machine images are included.

Also, instead of calculating similarities for the entire write data, by dividing the write data into a plurality of portions and calculating similarities for each of the portions, the amount of computation can be reduced. As a result, it becomes possible to shorten time required for compression to be completed.

Further, among clusters generated by the $n^{th}$ stage clustering, by excluding clusters having low locality of access from being subjected to the $(n+1)^{th}$ stage clustering, a decrease in data reading performance can be suppressed.

Second Embodiment 2

In a second embodiment, write data is divided such that blocks written to the same logical volume are included in the same partial data.

Figure 16:
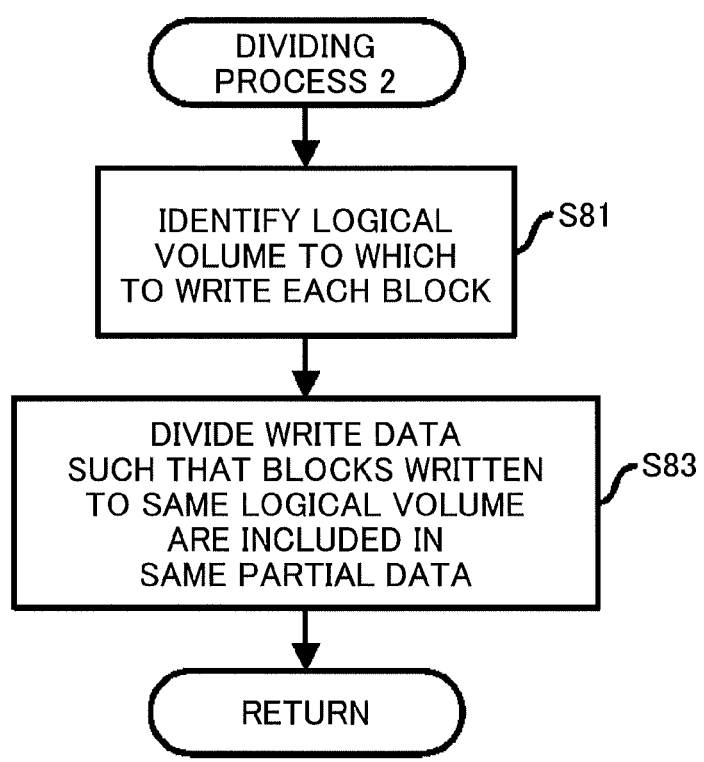
FIG. 16 is a flowchart illustrating a flow of a dividing process according to a second embodiment.

FIG. 16 is a flowchart illustrating a flow of a dividing process according to the second embodiment.

The dividing unit 1031 identifies a logical volume to which to write each block included in write data (step S81 in FIG. 16). The logical volumes are identified by logical unit numbers (LUNs), for example.

The dividing unit 1031 divides the write data such that blocks written to the same logical volume are included in the same partial data (step S83). The process returns to the caller.

By performing the above-described processing, blocks that are highly likely to be similar are included in the same partial data. Accordingly, a compression ratio can be improved.

However, in the second embodiment, write data may be divided such that the number of divisions is determined according to the first embodiment.

Third Embodiment

In a third embodiment, write data is divided such that blocks written from the same VM are included in the same partial data.

Figure 17:
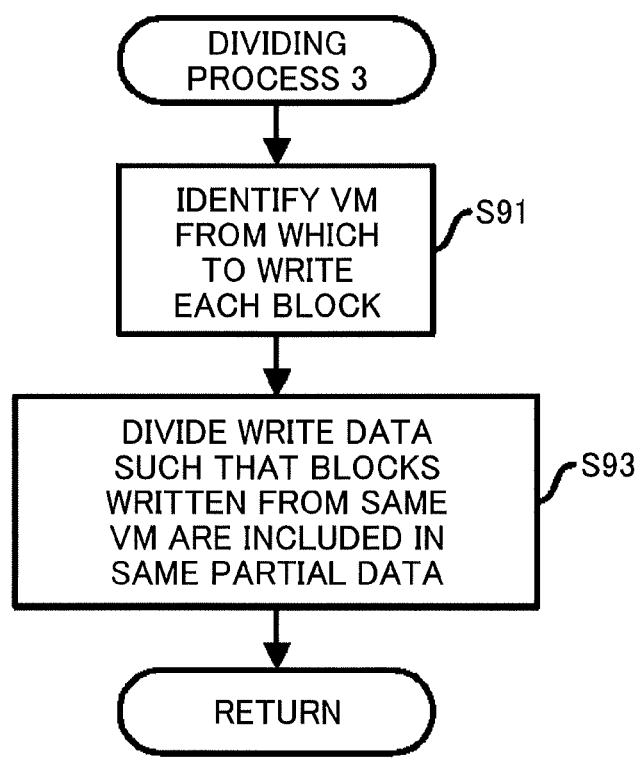
FIG. 17 is a flowchart illustrating a flow of a dividing process according to a third embodiment.

FIG. 17 is a flowchart illustrating a flow of a dividing process according to the third embodiment.

The dividing unit 1031 identifies a VM from which to write each block included in write data (step S91 in FIG. 17). The VMs from which to write blocks are identified by addresses, for example.

The dividing unit 1031 divides the write data such that blocks written from the same VM are included in the same partial data (step S93). The process returns to the caller.

By performing the above-described processing, blocks that are highly likely to be similar are included in the same partial data. Accordingly, a compression ratio can be improved. For example, a plurality of blocks written by the same VM are highly likely to include the same data column.

However, in the third embodiment, write data may be divided such that the number of divisions is determined according to the first embodiment.

Further, in the above-described example, the write data is divided such that blocks written from the same VM are included in the same partial data. However, the write data may be divided such that blocks written from the same host apparatus are included in the same partial data.

Fourth Embodiment

In a first embodiment, it is determined whether a cluster is subjected to the $(n+1)^{th}$ stage clustering in terms of write access interval. Conversely, in the fourth embodiment, it is determined whether a cluster is subjected to the $(n+1)^{th}$ stage clustering in terms of logical address range.

Figure 18:
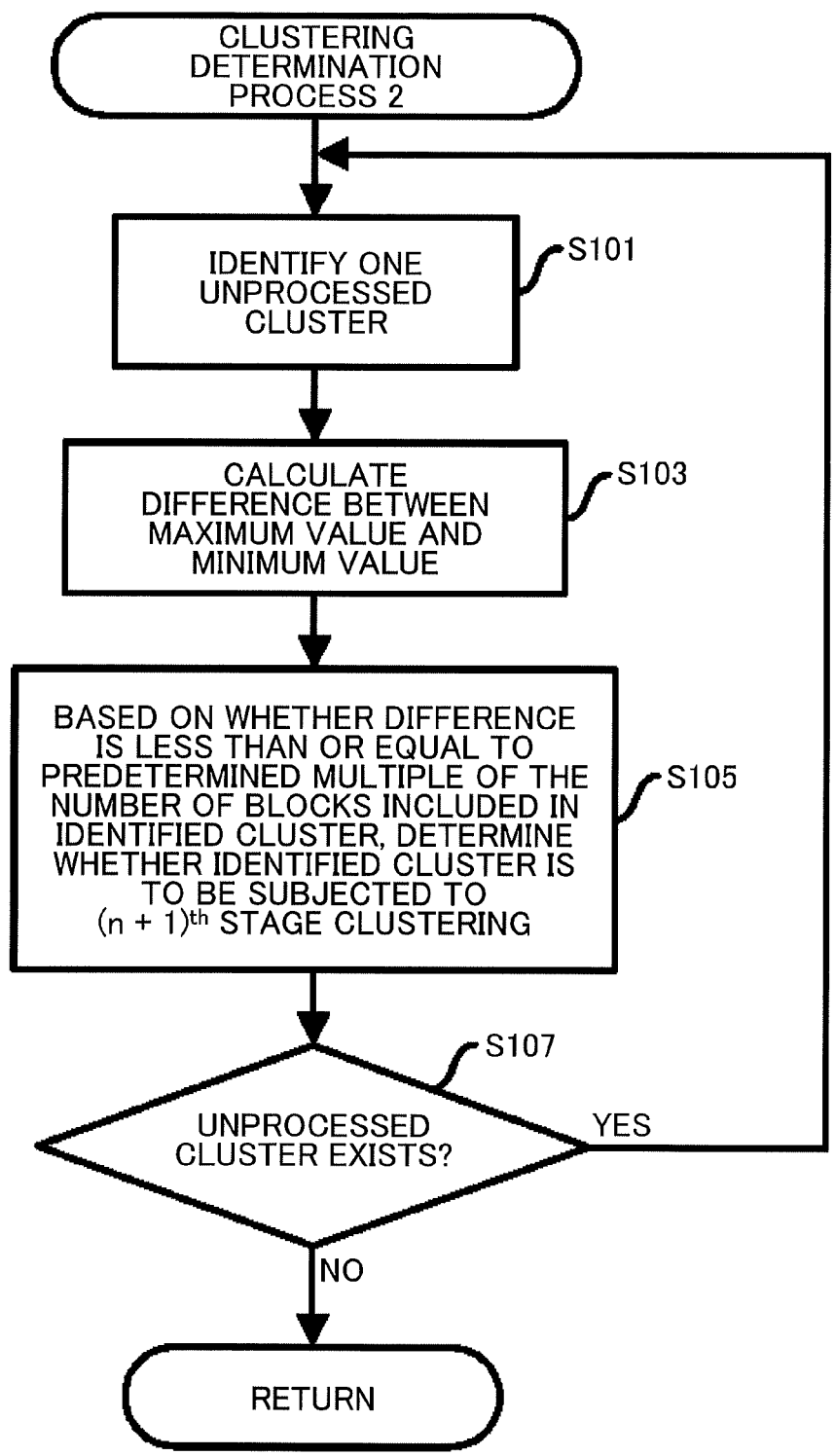
FIG. 18 is a flowchart illustrating a flow of a clustering determination process according to a fourth embodiment.

FIG. 18 is a flowchart illustrating a flow of a clustering determination process according to the fourth embodiment. The clustering determination process is preferably performed when the dividing process according to the second embodiment is performed.

From the clusters generated by the previous clustering (namely, the clusters generated by clustering in step 13 or by clustering in step S25), the second clustering unit 1037 identifies one unprocessed cluster (step S101 in FIG. 18).

The second clustering unit 1037 calculates a difference between a maximum value and a minimum value of a logical address to which to write blocks that are included in the cluster identified in step S101 (step S103).

Based on whether the difference calculated in step S103 is less than or equal to a predetermined multiple of (for example, two times) the number of the blocks that are included in the cluster identified in step S101, the second clustering unit 1037 determines whether the cluster identified in step S101 is to be subjected to the $(n+1)^{th}$ stage clustering (step S105).

The second clustering unit 1037 determines whether an unprocessed cluster exists (step S107). When an unprocessed cluster exists (yes in step S107), the process returns to step S101. When an unprocessed cluster no longer exists (no in step S107), the process returns to the caller.

As described above, by limiting clusters subjected to the $(n+1)^{th}$ stage clustering in terms of spatial locality, a decrease in data reading performance can be suppressed. Namely, there is an increased possibility that data decompressed and expanded in the cache region 102 is effectively utilized.

Although the present invention has been described with reference to embodiments, the present invention is not limited to these embodiments. For example, the above-described functional block configuration of the storage system 1 does not necessarily conform to the actual program module configuration.

Further, as long as processing results do not change, the order of process flows may be changed. Moreover, the process flows may be concurrently performed.

Further, the process performed by the deduplication unit 101 may be omitted.

The above-described embodiments are summarized as follows.

An information processing apparatus according to a first aspect of the embodiments includes (A) a dividing unit (as an example of the dividing unit 1031 according to the embodiments) configured to divide data including a plurality of blocks, (B) a first execution unit (as an example of the first clustering unit 1035 according to the embodiments) configured to perform, for each portion generated by dividing the data, first clustering of blocks included in each of the portions based on a similarity between each pair of the blocks included in each of the portions, and (C) a determining unit (as an example of the writing unit 1039 according to the embodiments) configured to determine, among the plurality of blocks, blocks to be collectively compressed based on results of the first clustering performed for each of the portions.

Accordingly, compared to when the entire data is clustered, it is possible to reduce the amount of computation for determining blocks to be collectively compressed.

The information processing apparatus may further include (D) a second execution unit (as an example of the second clustering unit 1037 according to the embodiments) configured to extract, among a plurality of clusters generated by the first clustering performed for each of the portions, one block from each cluster satisfying a predetermined condition, and to perform second clustering of the clusters satisfying the predetermined condition based on a similarity of each pair of the extracted blocks. Further, the determining unit may be configured to determine, among the plurality of blocks, blocks to be collectively compressed based on results of the second clustering.

Multistage clustering allows more similar blocks to be included in the same cluster. Further, even when multistage clustering is performed, the amount of computation can be reduced compared to when clustering of the entire data is performed.

Further, the determining unit may (c2) collectively compress blocks included in each cluster generated by the second clustering, may collectively compress blocks included in each cluster generated by the first clustering and not included in any of the clusters generated by the second clustering, and may collectively compress blocks included in each cluster not satisfying the predetermined condition.

For example, as similar blocks are collectively compressed, a compression ratio can be improved.

Further, the dividing unit may (a1) determine a number of the portions generated by dividing the data, such that a throughput calculated based on the number of the portions generated by dividing the data, a data size, a block size, and time taken to calculate the similarities becomes greater than or equal to a target throughput.

Accordingly, a decrease in a compression throughput can be suppressed.

Further, the dividing unit may (a2) divide data such that blocks written to the same logical volume are included in the same portion.

Blocks having the same data column are more likely to be included in the same cluster.

Further, the dividing unit may (a3) divide data such that blocks written from the same source can be included in the same portion.

Blocks having the same data column are more likely to be included in the same cluster.

Further, the first execution unit may (b1) perform the first clustering based on a method for generating clusters from pairs having similarities greater than a predetermined value among pairs of the blocks included in each of the portions or based on k-means clustering using similarities.

Accordingly, the first clustering can be appropriately performed based on similarities.

Further, the first execution unit may (b2) exclude, among the blocks included in each of the portions, blocks having similarities less than or equal to the predetermined value from being subjected to the first clustering.

It becomes possible to exclude blocks that are less likely to contribute to an improvement in a compression ratio.

Further, the determining unit may (c3) individually compress the blocks excluded from being subjected to the first clustering.

Accordingly, even when blocks are individually compressed, a high compression ratio may be achieved in some cases.

Further, the information processing apparatus may further include (E) a calculating unit (as an example of the parameter calculating unit 1033 according to the embodiments) configured to calculate the predetermined value such that an average number of blocks included in each cluster generated by clustering sample data becomes a value that is obtained by multiplying a numerical value representing a requirement for reading latency from a storage device by a reading speed from the storage device and subsequently dividing the numerical value by a block size.

It is possible to reduce the time taken to read compressed data stored on the storage device.

Further, the predetermined condition may be a condition such that a difference between a maximum value and a minimum value of a logical address to which to write blocks included in a cluster is less than or equal to a multiple of the number of the blocks included in the cluster, or a condition that variance of write access intervals for the blocks included in the cluster is less than or equal to a predetermined interval.

Accordingly, a cluster regarded as having high access locality can be subjected to the second clustering. As a result, a decrease in the reading speed can be suppressed.

Further, the second execution unit may (d1) extract, among a plurality of clusters generated by the second clustering, one block from each cluster satisfying the predetermined condition, and may perform the second clustering of the clusters satisfying the predetermined condition based on a similarity between each pair of the extracted blocks.

The clustering of clusters can be easily performed.

Further, the first execution unit may (b3) calculate hash values of the blocks included in each of the portions, and may perform the first clustering for each of the portions based on a similarity between each pair of the calculated hash values.

Accordingly, similarities can be easily calculated.

An information processing method according to a second aspect of the embodiments includes (F) dividing data including a plurality of blocks, (G) performing, for each portion generated by dividing the data, first clustering of blocks included in each of the portions based on a similarity between each pair of the blocks included in each of the portions, and (H) determining, based on results of the first clustering performed for each of the portions, blocks to be collectively compressed among the plurality of blocks.

Further, a program for causing a processor to execute a process including the above-described method can be created. The program is stored, for example, in a computer-readable recording medium or a storage device such as a flexible disk, a CR-ROM, a magneto-optical drive, semiconductor memory, and a hard disk. Further, intermediate processing results are temporarily stored in a storage device such as a main memory.

According to at least one embodiment, it is possible to reduce the amount of computation for determining blocks to be collectively compressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. An information processing apparatus comprising:
   a data storage; and
   a processor coupled to the data storage and that executes a process including dividing data including a plurality of blocks,
   performing, for each of portions generated by dividing the data, first clustering of blocks included in each of the portions based on similarities between the blocks included in each of the portions, to generate first clusters,
   determining, for each of the first clusters, whether one of the first clusters that satisfies a predetermined condition is subjected to second clustering,
   extracting a representative block from each of second clusters, from among the first clusters, which satisfy the predetermined condition and are determined to be subjected to second clustering,
   performing second clustering based on similarities between the extracted representative blocks from the second clusters, determining, among the plurality of blocks, blocks to be collectively compressed based on results of the second clustering performed for each of the second clusters, and collectively compressing data of the determined blocks before storing the data into the data storage, wherein the predetermined condition is at least one of:
a difference between maximum and minimum logical address values to which to write blocks included in a cluster being less than or equal to a value relating to a number of blocks included in a cluster; or
a variance in write access intervals for blocks included in a cluster being less than or equal to a predetermined interval.

2. The information processing apparatus according to claim 1, wherein the collectively compressing includes collectively compressing blocks included in each second cluster generated by the second clustering, collectively compressing blocks included in each first cluster generated by the first clustering and not included in any of the second clusters generated by the second clustering, and collectively compressing blocks included in each first cluster not satisfying the predetermined condition.

3. The information processing apparatus according to claim 1, wherein the dividing includes determining a number of the portions generated by dividing the data, such that a throughput calculated based on the number of the portions generated by dividing the data, a data size, a block size, and time taken to calculate the similarities becomes greater than or equal to a target throughput.

4. The information processing apparatus according to claim 1, wherein the dividing includes dividing the data such that blocks written to a same logical volume are included in a same portion.

5. The information processing apparatus according to claim 1, wherein the dividing includes dividing the data such that blocks written from a same source are included in a same portion.

6. The information processing apparatus according to claim 1, wherein the performing the first clustering includes performing the first clustering based on a method for generating clusters from pairs having similarities greater than a predetermined value among pairs of the blocks included in each of the portions or based on k-means clustering using similarities.

7. The information processing apparatus according to claim 1, wherein the performing the first clustering includes excluding, among the blocks included in each of the portions, blocks having similarities less than or equal to a predetermined value from being subjected to the first clustering.

8. The information processing apparatus according to claim 7, wherein the collectively compressing includes individually compressing the blocks excluded from being subjected to the first clustering.

9. The information processing apparatus according to claim 8, wherein the process further includes calculating the predetermined value such that an average number of blocks included in each cluster generated by clustering sample data becomes a value that is obtained by multiplying a numerical value representing a requirement for reading latency from a storage device by a reading speed from the storage device and subsequently dividing the numerical value by a block size.

10. The information processing apparatus according to claim 1, wherein the performing the first clustering includes calculating hash values of the blocks included in each of the portions, and performing the first clustering for each of the portions based on similarities between the calculated hash values.

11. A non-transitory recording medium having stored therein a program for causing a computer to execute a process comprising:
dividing data including a plurality of blocks;
performing, for each of portions generated by dividing the data, first clustering of blocks included in each of the portions based on similarities between the blocks included in each of the portions, to generate first clusters;
determining, for each of the first clusters, whether one of the first clusters that satisfies a predetermined condition is subjected to second clustering;
extracting a representative block from each of second clusters, from among the first clusters, which satisfy the predetermined condition and are determined to be subjected to second clustering;
performing second clustering based on similarities between the extracted representative blocks from the second clusters; and
determining, among the plurality of blocks, blocks to be collectively compressed based on results of the second clustering performed for each of the second clusters;
wherein the predetermined condition is at least one of:
a difference between maximum and minimum logical address values to which to write blocks included in a cluster being less than or equal to a value relating to a number of blocks included in a cluster; or
a variance in write access intervals for blocks included in a cluster being less than or equal to a predetermined interval.

12. An information processing method performed by a computer, the method comprising:
dividing data including a plurality of blocks;
performing, for each of portions generated by dividing the data, first clustering of blocks included in each of the portions based on similarities between the blocks included in each of the portions, to generate first clusters;
determining, for each of the first clusters, whether one of the first clusters that satisfies a predetermined condition is subjected to second clustering;
extracting a representative block from each of second clusters, from among the first clusters, which satisfy the predetermined condition and are determined to be subjected to second clustering;
performing second clustering based on similarities between the extracted representative blocks from the second clusters; and
determining, among the plurality of blocks, blocks to be collectively compressed based on results of the second clustering performed for each of the second clusters;
wherein the predetermined condition is at least one of:
a difference between maximum and minimum logical address values to which to write blocks included in a cluster being less than or equal to a value relating to a number of blocks included in a cluster; or
a variance in write access intervals for blocks included in a cluster being less than or equal to a predetermined interval.

* * * * *